May 15, 1956 E. GISONDI 2,745,308
SHEET METAL NAIL HAVING CHANNEL SHAPED BARBED SPREADING LEGS
Filed March 29, 1955
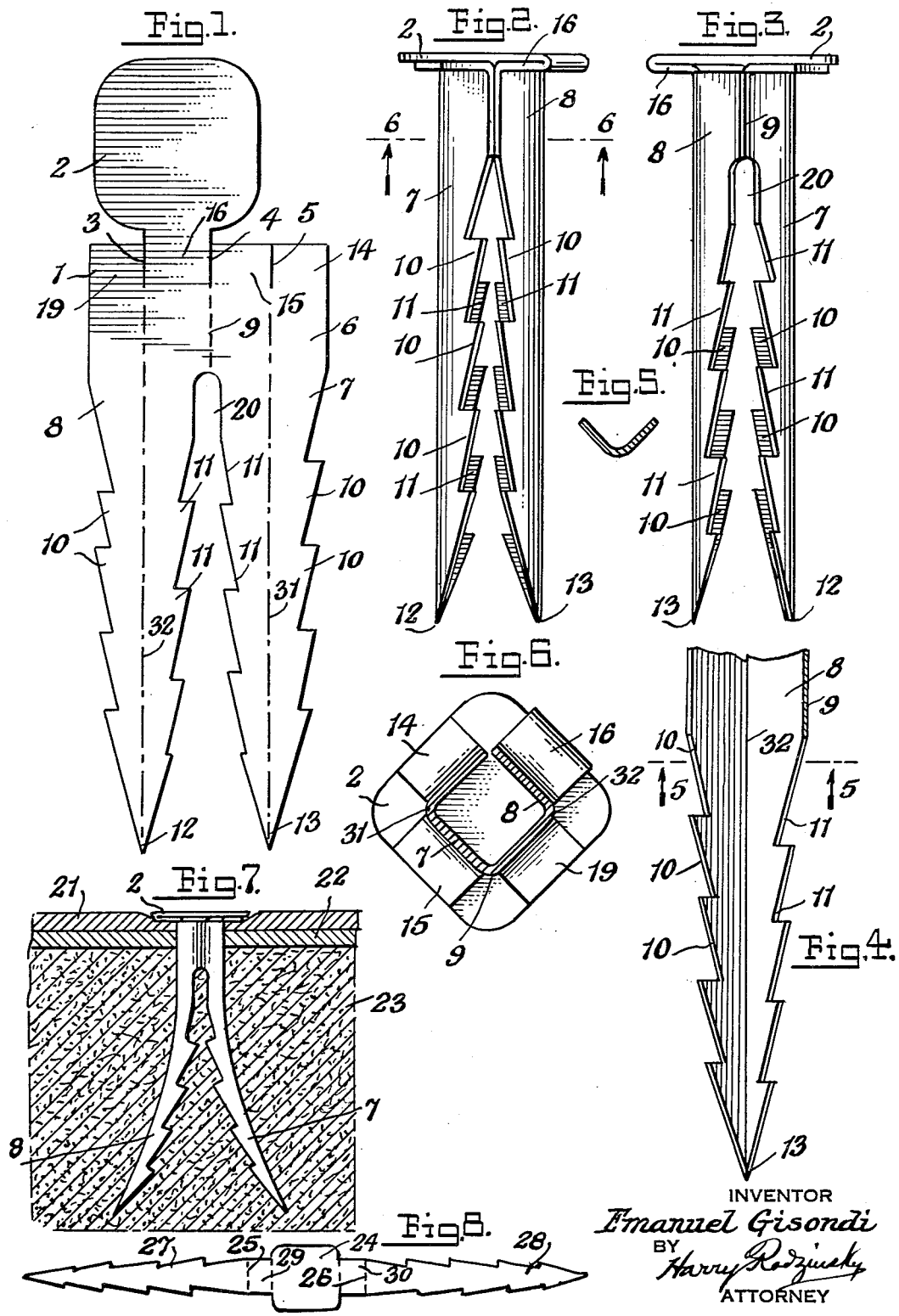
INVENTOR
*Emanuel Gisondi*
BY *Harry Rodzinsky*
ATTORNEY

United States Patent Office 2,745,308
Patented May 15, 1956

2,745,308

SHEET METAL NAIL HAVING CHANNEL SHAPED, BARBED SPREADING LEGS

Emanuel Gisondi, Scarsdale, N. Y.

Application March 29, 1955, Serial No. 497,695

3 Claims. (Cl. 85—13)

This invention relates to nails, and more particularly to a nail composed of sheet metal and adapted to self-clench or securely anchor itself when driven home and especially when driven into soft or so-called "low-density" material into which nails of conventional construction are incapable of securely holding.

Many materials used in building construction at the present time are very difficult to employ when it is necessary to securely fasten articles to them. This is particularly true in the case of various types of relatively soft wall boards, such as those made of cane fibres and like materials. The builder faced with the problem of attaching shingles, siding and like elements to these soft and penetrable sheet materials, finds it difficult indeed to securely fasten them in place.

It is therefore an object of the present invention to provide a nail especially adapted for securing shingles, siding or other material to soft and penetrable wall board or roofing, which nail shall, by a simple driving movement, clench or spread its legs in a manner to positively prevent its removal from the board, except by the destruction of a substantial area of the board itself. It is an object of the invention to provide a nail of this character made of sheet metal, so that it shall be of light weight, strong, easily driven and positively locking, thereby enabling the work of fastening shingles, siding or the like to proceed rapidly and accurately.

More particularly, the invention contemplates the provision of a nail having a pair of legs integrally extending therefrom the head and legs being formed of one piece or blank of sheet metal, with the head of channel shape, and barbed on their edges, the barbed edges of one of the legs facing the similar edges of the second leg, and with the concave sides of the nails directed toward one another, the legs diverging adjacent to their pointed extremities, which diverging parts of the legs, causes spreading of the legs when the nail is driven into the soft or low-density material.

It is another object of the invention to provide a sheet-metal nail having a head formed integrally with the pair of legs on the nail and which head shall be stiffened and reinforced by lateral, tab-like extensions on the legs.

It is another object of the invention to provide a nail having a pair of legs adapted to be spread apart by the operation of driving the nail and which legs shall present angular faces to the direction of spreading movement, to thereby avoid material resistance thereto.

With these and other objects to be hereinafter set forth, in view, I have devised the arrangement of parts to be described and more particularly pointed out in the claims appended hereto.

In the accompanying drawing, wherein an illustrative embodiment of the invention is disclosed, Fig. 1 is a face view of the sheet-metal blank from which the improved nail is produced;

Fig. 2 is a side elevational view of the finished nail;

Fig. 3 is a side elevational view of the nail, looking at the side of the same opposite to that of Fig. 2;

Fig. 4 is a view looking at the inner face of one of the legs of the nail;

Fig. 5 is a sectional view, taken substantially on the line 5—5 of Fig. 4, looking in the direction of the arrows;

Fig. 6 is a sectional view, taken substantially on the line 6—6 of Fig. 2, looking in the direction of the arrows;

Fig. 7 is a view, showing how the legs of the nail will spread when thte nail is driven into material, and Fig. 8 is a face view of a blank from which a nail of modified construction is made.

Referring to the drawing, and more particularly to Fig. 1 thereof, 1 indicates the blank from which the nail is made. The blank disclosed may be made from relatively thin sheet metal of a rust-resistant nature or of a metal that has been treated to be resistant to corrosion. In the form shown, the blank 1 is provided at one end with the disk-like part 2 which forms the head of the nail, and which is integrally connected to the body 6 by the neck portion 16, the side edges of which are defined by the spaced, parallel slits 3 and 4. Extending inwardly from the upper edge of the body portion 6 and parallel to the slits 3 and 4, is a slit 5, and said slit 5, together with the slits 3 and 4, divide the top edge of the body 6 into the four lug portions indicated respectively at 14, 15, 16 and 19. These four lug portions extend under and come into contact with and reinforce the head 2 in the manner shown in Fig. 6.

The body portion 6 of the blank is bifurcated or longitudinally divided into the two sections indicated respectively at 7 and 8, which sections form the two legs of the nail. It will be noted that one edge of each of the legs 7 and 8 is toothed or serrated in a manner to provide the barbs 10, while the second edge of each of the legs is barbed as indicated at 11. The barbs 11 are staggered with respect to those indicated at 10, as will be apparent from Figs. 1 to 4 inclusive. Thus, when the leg 7 is longitudinally folded on the line 31 to cause it to assume a flattened V-shape in cross section, as seen in Figs. 5 and 6, the barbs formed on one of the edges of the leg will be transversely disaligned with those on the second edge of the leg. Similarly, when the leg 8 is longitudinally folded on the line 32 to form it into the desired flattened V-shape, the barbs 10 and 11 on the two edges of this leg will be disaligned or staggered. This staggered arrangement of the teeth or barbs on the two legs provides greater anchoring facility for the nail.

In converting the blank 1 to the finished nail shown in Fig. 2 and 3, the blank is folded on the three longitudinal fold lines 9, 31 and 32, and the head 2 is folded down at the upper end of the neck 16. The lugs 14, 15 and 19 are bent laterially to underlie and contact with the head, and these three lugs, together with the neck portion 16, extend out laterally from the upper ends of the legs 7 and 8 and contact the undersurface of the head to thereby greatly stiffen and reinforce the head.

The finished nail is shown in Figs. 2 and 3, wherein it will be observed that the facially-opposed concave surfaces of the two legs 7 and 8 present staggered teeth or barbs along their edges, and the teeth on one of the legs, face inwardly toward the teeth on the other leg. The flattened V-shape of the legs is such that the two legs co-operate in forming a nail shank of substantially square or rectangular cross-section, as will be apparent from Fig. 6.

In Fig. 7 is disclosed the manner in which the legs of the nail will spread apart when the nail is driven into material. Therein, the overlapped portions of shingles, siding or other penetrable material are indicated at 21 and 22, and which are attached to a base material of low density, such as fibre board indicated at 23. The nail is driven through the materials 21 and 22 and into the board 23 by hammer blows, and as it encounters the resistance of the material 23, the legs 7 and 8 will tend to spread apart, or separate, at a point beginning with the notch 20, toward the pointed ends 12 and 13 of the legs. The angular cross-sectional shape of the legs 7 and 8 is such that the legs will spread outwardly with a minimum of resistance due to the inclined surfaces on the legs, and which are presented in the direction of outward movement of the legs during the spreading action. When the legs spread outwardly as above described, and they very often spread to an extent considerably greater than that shown in Fig. 7, according to the density of the material into which the nail is driven, a clenching action is attained, and the angularity of the spread legs, and the barbed arrangement thereon, strongly resist displacement of the nail out of the material. In fact, tests have indicated that the material through which the nail is driven, will pull apart or disintegrate when an effort is made to draw out the nail, rather than permit withdrawal of the nail. The staggered arrangement of the barbs or teeth on the edges of the legs of the nail permits easy driving of the and materially increases the resistance of the nail to withdrawal. It will be further noted that the edges of the legs 7 and 8 are inclined or diverge toward the pointed ends 12 and 13, as indicated at 33 and 34, which arrangement materially facilitates the spreading of the legs when the nail is driven.

In Figs. 1 to 3 is shown a nail wherein the two legs are brought to a facially-disposed position by the longitudinal folding of a bifurcated strip. In Fig. 8 is shown a blank from which a nail may be produced in a different manner. Therein, the blank consists of an elongated strip having a disk-like central portion 24 constituting the head of the nail. Extending in opposite directions from the head 24 are the legs 27 and 28, the same being substantially similar to those shown at 7 and 8 in Figs. 1 to 3, and having the same staggered barb arrangement. These legs 27 and 28 are also longitudinally folded down their centers to form them into the flattened V-shape heretofore described. Leg 27 is integrally connected to the head by the neck portion 29, and leg 28 is connected to the head by a similar neck portion 30. When the legs 27 and 28 are folded on their respective fold lines 25 and 26 and the neck portions 29 and 30 folded underneath the head 24, the forming of the nail will be complete.

Having described a single embodiment of the invention, it is obvious that the same is not to be restricted thereby, but is broad enough to cover all structures coming within the scope of the annexed claims.

What I claim is:

1. A sheet metal nail comprising, a head, a channel-shaped leg of substantially V-shape in cross-section extending therefrom, the leg being barbed along its edges, said leg having an integral, laterally-extending portion connected to a second similar channel-shaped, barbed-edge leg, the legs having their barbed edges and concave sides directed toward each other to form a shank substantially rectangular in cross-section with the edges adjacent the head in contact with each other, the barbed edges of the legs diverging adjacent to the ends of the legs whereby percussive contact with the nail head will cause the legs to spread apart when driven into work, both legs being provided with a plurality of lugs extending substantially at right angles with respect to the leg and underlying and contacting the head for reinforcing the head.

2. A sheet metal nail as provided in claim 1, wherein one of the lugs of the first-named leg constitutes an integral link between the head and said leg.

3. A sheet metal nail as provided in claim 1, wherein the barbs of the legs at one side of the shank are staggered with respect to the barbs of the legs at the other side of the shank.

References Cited in the file of this patent

UNITED STATES PATENTS

| | | |
|---|---|---|
| Re. 22,758 | Gisondi | May 21, 1946 |
| 172,753 | Lindsey | Jan. 25, 1876 |
| 285,640 | McGill | Sept. 25, 1883 |
| 308,837 | Frost | Dec. 2, 1884 |
| 727,111 | Duffy | May 5, 1903 |
| 2,427,959 | Gisondi | Sept. 23, 1947 |
| 2,559,570 | Poupitch | July 3, 1951 |

FOREIGN PATENTS

| | | |
|---|---|---|
| 11,065 | Great Britain of 1913 | July 17, 1913 |
| 192,492 | Great Britain | Feb. 5, 1923 |
| 414,513 | Great Britain | Aug. 9, 1934 |
| 891,332 | France | Dec. 11, 1943 |